Patented June 7, 1932

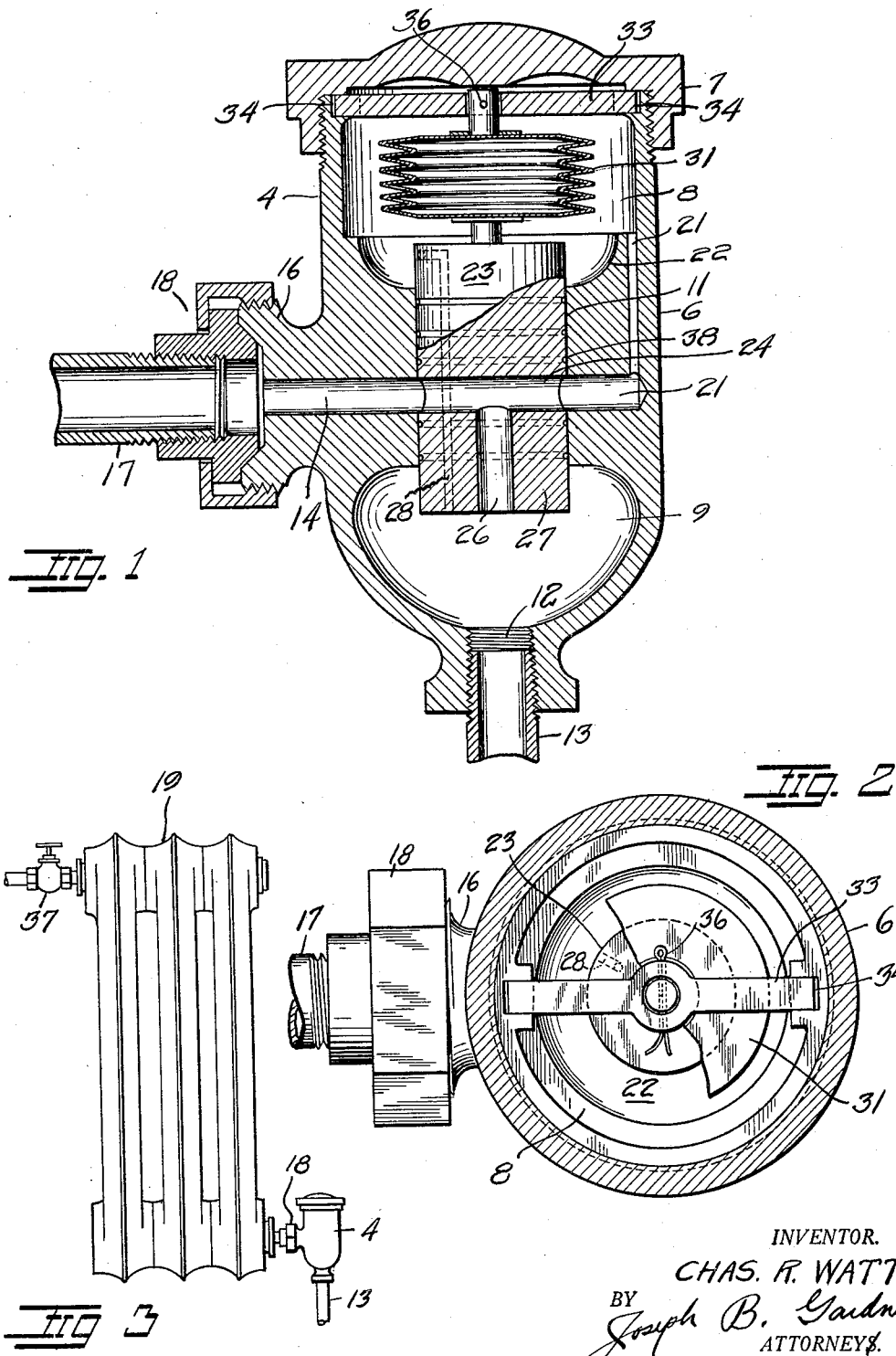

1,861,650

UNITED STATES PATENT OFFICE

CHARLES R. WATTS, OF BERKELEY, CALIFORNIA, ASSIGNOR OF ONE-THIRD TO EDWARD L. WATTS AND ONE-THIRD TO CHARLES R. WATTS, JR., BOTH OF BERKELEY, CALIFORNIA

STEAM RADIATOR TRAP

Application filed April 23, 1928. Serial No. 272,101.

The invention relates to a device for effecting an automatic trapping and discharge of air and condensate from a steam radiator without permitting an escape of uncondensed steam from the radiator.

An object of the invention is to provide a trap of the class described in which a thermostatic disc forming a part thereof is disposed in a by-pass of the radiator discharge passage rather than directly in said passage, thereby insuring a particularly steady operation of the device.

Another object of the invention is to provide a trap of the class described having a valve controlled by the thermostatic disc thereof so constituted as to simultaneously govern the fluid flow through the discharge passage and by-pass.

A further object of the invention is to provide a trap of the character described which operates independently of the pressure conditions in an associated radiator and cannot be injured by unusual variations in said pressure conditions.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing,

Figure 1 is a side sectional view of a trap embodying the invention.

Figure 2 is a plan view of the trap structure taken on the line 2—2 in Figure 1.

Figure 3 is a reduced view showing the trap operatively associated with a steam radiator.

Essentially and as shown, the trap 4 of my invention comprises a body member 6 and a cap member 7. The body 6 is generally cylindrical and is designed to be disposed with its axis vertical. Formed in the body adjacent the top and bottom thereof are chambers 8 and 9 respectively, and said chambers are connected by means of a bore 11 of uniform cross section and of less diameter than the chambers. The cap member 7 is arranged to provide the top wall for the upper chamber 8 and is here shown threadedly mounted on the upper body end for the purpose. A passage 12 leads axially downwardly from the lower cavity 9, the walls of said passage being here shown threaded for effecting the connection of a discharge pipe 13 therewith.

Extending radially into and through the body at an intermediate point thereof is an inlet passage 14, said passage extending to the bore 11. The passage 14, it is noted, extends into and through a body extension 16 arranged for connection with a pipe 17 by means of a coupling 18 of a usual type, said pipe 17 serving to connect the device with the discharge or return outlet of a radiator 19, or the like. A passage 21 is provided in the body, said passage connecting a point in the bore generally opposite the outlet of the passage 14 with the upper chamber 8 and being preferably somewhat smaller than the passage 14. As shown, the passage 14 and the lower portion of the passage 21 are aligned and are of like section, whereby their provision by drilling into and through the body is arranged to be effected. The bottom side 22 of the upper chamber 8 is concave whereby any liquid in said chamber will be directed inwardly toward the bore 11.

It will now be noted that the flow of fluid through and from the trap 4 is arranged to be controlled by a valve plug 23 engaged in the bore 11 and providing means for variably connecting the passage 14 with the body chambers 8 and 9. In the present embodiment, the plug 23 is arranged to vary the connections provided thereby by and upon its axial displacement in the bore 11 and is appropriately ported for this purpose. Accordingly, and as shown, a port 24 is provided transversely through the plug for connecting the passages 14 and 21 and a port 26 extends axially through the plug from the port 24 to discharge at the lower end 27 of the plug. In this manner, when the plug is disposed to place the port 24 in registration with the passages 14 and 21, a free passage for fluid is provided from the passage 14 to both of the chambers 8 and 9.

To permit a free introduction of fluid into the chamber 8 through the passage 21, a port 28 is also provided in the plug 23, said port extending from a point in a side of the plug adjacent the top thereof to the bottom end 27 of the plug and being independent of the ports 24 and 26. The inlet end of the port 28 is arranged to lie above the lower portion of the bottom 22 of the chamber 8 when the plug is disposed with the port 24 thereof in registration with the passages 14 and 21, and to be closed by the bore only when the port 24 is closed by the bore.

The disposal of the plug in its different positions is arranged to be controlled in accordance with the temperature in the upper chamber 8. Accordingly, and as shown, a thermostatic disc 31 is fixedly mounted on the body member 6 for disposal in the chamber 8, said disc preferably containing a volatile fluid sealed therein and being arranged to expand axially of the chamber when heated. The plug 23 is fixed to the free or movable end 32 of the disc whereby its disposal in the bore 11 is arranged to be controlled by the temperature in the chamber 8 in a well understood manner. When the radiator is cool, the plug, it is noted, is arranged to be disposed with its various ports connected and open as is shown in the drawing.

In the present embodiment the disc 31 is pivotally and axially supported from a cross member 33 resting in opposed seats 34 provided in the upper end of the body 6, by means of a pivot pin 36, the axis of said pin being perpendicular to the plug axis and the line of the port 24. In this manner, binding of the valve plug in the bore 11 is prevented and the plug is held against rotation in the bore. This mounting for the disc and plug, it is noted, permits an operative disposition of the disc and plug in their places before the cap is installed, whereby the need for any adjustments may be readily determined, the screwing down of the cap thereafter being arranged to lock the member 33 in place.

With the radiator cold and filled with air, and the plug disposed as shown, the admission of steam to the radiator through the radiator control valve 37 will force the cool air from the radiator out through the trap and into the return pipe 13, it being noted that any water which might tend to collect in the radiator will have previously drained out from the radiator through the plug ports 24 and 26. As the steam enters the radiator and warms the same, a certain amount thereof condenses and runs downwardly out of the radiator and into the return pipe with the escaping air. Finally, the radiator becomes filled with live steam which follows the water and air to the trap. The water all escapes gravitationally to the chamber 9 and discharge pipe 13 while a charge of the steam travels through the passage 21 to the upper chamber 8. The steam in the chamber 8 raises the temperature therein and effects an expansion of the disc 31 whereby the plug is displaced downwardly and the various ports of the plug are closed, thereby shutting off the steam supply to the chamber 8. A cooling and condensation of imprisoned steam in the latter chamber will occur by reason of the radiation of heat from the trap body whereby if no new steam enters the chamber 8, the valve will open by reason of the resulting cooling of the disc 31. In practice, however, a balanced position of the plug will be reached whereby the admission of steam to the chamber 8 will be permitted at such a rate as to maintain a constant, or only slightly variant, temperature therein. Under these conditions, the escape of condensate from the radiator is permitted at the rate at which it is formed, it being clear that the condensation rates in the radiator and chamber 8 will bear a fixed relation at all times and that the cooperative relations of the various ports and passages is such as will effect this result.

It will be particularly noted that the fit of the plug in the bore is such that only a sufficient amount of the condensate in the chamber 8 is arranged to travel downwardly along the plug to provide a water packing for said plug in its bore, such feature constituting a necessary and important element of the present structure. To further insure a seal of the plug in the bore, annular grooves 38 are preferably provided in the bore or on the plug surface, such grooves being here shown provided on the plug surface.

The bottom chamber 9 and discharge pipe 13, it is noted, are arranged to freely receive the escaping air and condensate, and a slight degree of vacuum may be maintained therein if necessary to insure the free escape of said air and condensate. Owing to the condensation of steam in the chamber 8, the consequent lowering of pressure therein will tend to draw the fresh steam escaping from the radiator with the condensate thereinto rather than permitting the escape of such steam into the pipe 13, and the disposal of the chamber 8 above the passage 14 further assists in effecting such directing of said steam. In this manner, live steam is not permitted to escape into the pipe 13.

It will now be noted that the disposition of the thermostatic disc in the by-pass provided by the passage 21 and upper chamber 8, and so out of the path of the discharging condensate, provides for the operation of the device independently of the temperature of such condensate. Furthermore, if excessive temperatures or pressures obtain in the steam from the radiator, the valve will be immediately closed and so maintain its temperature at normal. And, further, by reason of the fact that the operation of the plug as a slide valve involves no stopped seating thereof, the bursting of the disc by reason of a temporary excessive temperature thereof is prevented. It will thus be clear that the present trap is particularly efficient for the purposes for which it has been designed, and is adapted for use under a wide variety of conditions.

I claim:

1. In a trap for condensate of a steam radiator or the like, a body providing a passage for the flow of the condensate through and from the trap and a by-pass of said passage arranged to receive steam from the radiator, a piston valve interposed in said passage and by-pass, the piston having openings providing portions of said passage and by-pass, and temperature operated means in said by-pass for controlling the fluid flow through the passage and by-pass.

2. In a trap for condensate of a steam radiator or the like, a body providing a passage for the flow of the condensate therethrough and therefrom, a by-pass of said passage arranged to receive steam from the radiator, and a bore connecting said passage and by-pass; a slide valve mounted in said bore providing openings arranged to serve as portions of said passage and by-pass, and disposable to variably control the flow of fluid therethrough; and means providing a water-packed engagement of said valve in said bore.

3. In a trap for condensate of a steam radiator or the like, a body providing a passage for the flow of the condensate therethrough, a by-pass of said passage arranged to receive steam from the radiator, and a bore connecting said passage and by-pass; a slide valve engaged in said bore and providing openings arranged to serve as portions of said passage and by-pass; and a thermostatic disc disposed in said by-pass and carrying said valve.

4. In a trap for condensate of a steam radiator, a body providing a passage for the flow of condensate through and from the trap and a by-pass of said passage arranged to receive steam from the radiator, a valve for controlling the fluid flow through the by-pass, a thermostatic element disposed in said by-pass and constituting means for maintaining the valve in and moving the valve into and out of its operative position, and a drain passage connecting said by-pass back to said first named passage, said drain passage by-passing said valve whereby condensate formed in said passage may flow directly into said first named passage when the valve is in closed position.

In testimony whereof, I have hereunto set my hand at Oakland, California, this 14th day of April, 1928.

CHARLES R. WATTS.